(No Model.)
H. M. BYLLESBY.
SYSTEM OF ELECTRICAL DISTRIBUTION.
No. 373,009. Patented Nov. 8, 1887.
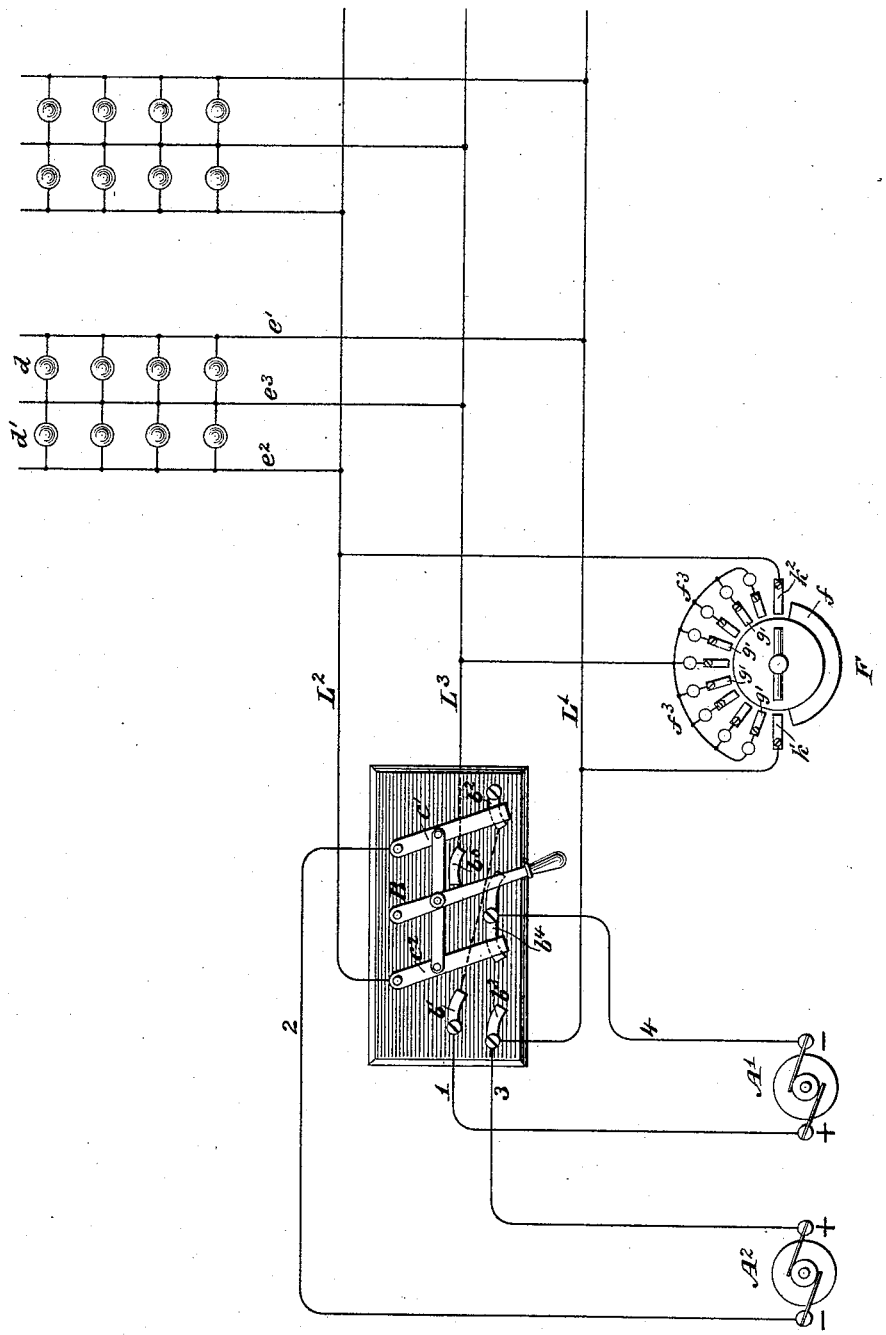
Witnesses
Geo. W. Breck
Carrie E. Ashley
Inventor
Henry M. Byllesby
By his Attorneys
Pope & Edgcomb

UNITED STATES PATENT OFFICE.

HENRY M. BYLLESBY, OF ROSELLE, NEW JERSEY, ASSIGNOR TO GEORGE WESTINGHOUSE, JR., OF PITTSBURG, PENNSYLVANIA.

SYSTEM OF ELECTRICAL DISTRIBUTION.

SPECIFICATION forming part of Letters Patent No. 373,009, dated November 8, 1887.

Application filed January 10, 1887. Serial No. 223,870. (No model.)

*To all whom it may concern:*

Be it known that I, HENRY M. BYLLESBY, a citizen of the United States, residing in Roselle, county of Union, and State of New Jersey, have invented certain new and useful Improvements in System of Electrical Distribution, of which the following is a specification.

The invention relates to an apparatus and organization of circuits for rendering it possible to readily operate a system of electrical distribution with a difference of potential of either of two different values—as one hundred and two hundred volts, for instance.

The invention relates especially to the so-called "three-wire" systems of electrical distribution.

In the accompanying drawing there is illustrated an organization of apparatus adapted to carry out the invention.

Referring to the figure, $A'$ $A^2$, respectively, represent electric generators capable of providing currents of, say, one hundred volts. It is designed that these currents shall be transmitted upon the main wires $L'$ $L^2$ of the system. For this purpose one pole—say the positive—of the generator $A'$ is connected, by a conductor, 1, with a contact-plate, $b'$, of a switch, B. This plate $b'$ is connected also with a plate, $b^2$. When the switch is in the position shown in the figure, an arm, $c'$, rests upon the plate $b^2$. This arm is connected by the conductor 2 with the negative pole of the generator $A^2$. The positive pole of the generator $A^2$ is connected by the conductor 3 with the contact-plate $b^3$ of the switch, and this plate is connected with the main line $L'$. The negative pole of the generator $A'$ is connected by the conductor 4 with a contact-plate, $b^4$, of the switch. The contact-arm $c^2$ of the switch, when in the position shown, rests upon the plate $b^4$, and is connected with the main line $L^2$. Currents therefore from the two generators in series will be sent upon the main lines $L'$ and $L^2$, the former being the positive and the latter the negative conductor.

Translating devices $d$ $d$ and $d'$ $d'$ are connected in circuit between the leads $e'$ $e^3$ and $e^3$ $e^2$. The conductors $e'$ are derived from the main line $L'$, and the conductors $e^2$ from the main line $L^2$. The conductors $e^3$ are derived from a third or neutral main line, $L^3$. The main line $L^3$ is connected with a plate, $b^5$, of the switch.

Considering the dynamos to be one-hundred-volt machines, it will be seen that the lamps or other translating devices $d$ and $d'$ are in this position of the switch operated by currents of two hundred volts, the lamps being in series. When it is desired to operate the entire plant as a one-hundred-volt system, the switch-handle C is moved to the left hand, and the connections of the switch while in that position are as follows: The positive poles of both generators $A'$ $A^2$ are connected, as before, with the plates $b'$ and $b^3$, respectively, while the arm $c^2$ makes contact with both these plates. The currents therefore of the positive poles of the two generators will pass to the two lines $L'$ and $L^2$. The negative poles of the two generators are at the same time connected together through the plate $b^4$ and switch-arm $c'$, and both are connected with the third line $L^3$ by reason of the arm $c'$ being in contact with the plate $b^5$. In this manner the conductors $L'$ and $L^2$ will be charged positively and the conductor $L^3$ negatively, and the difference of potential between the conductors $L'$ and $L^2$, and also between the conductors $L^2$ and $L^3$, will be one hundred volts.

In the drawing there is shown a circuit-controlling device, F, consisting of a switch-arm, $f$, adapted to make contact with successive resistances $f^3$, connected with the line $L^3$. These resistances may be connected between the line $L^3$ and either of the main lines $L'$ and $L^2$, the switch-arm being connected with the main line $L'$ or $L^2$ at will through a plate, $k'$ or $k^2$. By moving the switch into contact with the series of contact-points, $g'$ $g'$, connection may be made from the neutral wire $L^3$ to the corresponding main line, $L'$ or $L^2$, through a greater or less amount of resistance. This affords a convenient method of balancing and compensating for any reduction in the number of translating devices in circuit upon either side of the system.

I claim as my invention—

1. The combination, with two sources of electricity and two main lines, of circuit-connections with said main lines placing the sources in series, a third line and a switch device serving, when operated, to sever the normal connections and substitute therefor connections from corresponding poles of each source to the two main lines and from the remaining poles with the third line.

2. In a system of electrical distribution, a normally-positive and a normally-negative main line, and a third line, two sources of electricity, a switch normally placing said sources in connection with the positive and negative wires of the system in series, and serving, when operated, to substitute for such connections a connection from like poles of the sources with the normally positive and negative main lines and from the remaining poles with the third line.

3. In a system of electrical distribution, a normally-positive main line and a normally-negative line, a neutral conductor, an artificial resistance, a switch for placing more or less of said resistance between the neutral wire and either the positive or negative main line, and a switch device serving to connect the neutral wire with the negative source of electricity and the normally-negative wire with the positive source.

In testimony whereof I have hereunto subscribed my name this 9th day of December, A. D. 1886.

HENRY M. BYLLESBY.

Witnesses:
A. T. BUVARD,
CHARLES A. TERRY.